United States Patent
Wagner et al.

(10) Patent No.: US 11,449,301 B1
(45) Date of Patent: *Sep. 20, 2022

(54) INTERACTIVE PERSONALIZED AUDIO

(71) Applicant: Amazon Technologies, Inc., Seattle, WA (US)

(72) Inventors: Eric Michael Wagner, Seattle, WA (US); Donald Loyd Kaufman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,555

(22) Filed: Jan. 4, 2019

Related U.S. Application Data

(63) Continuation of application No. 14/981,090, filed on Dec. 28, 2015, now Pat. No. 10,175,933.

(51) Int. Cl.
    *H04N 21/45* (2011.01)
    *G06F 3/16* (2006.01)

(52) U.S. Cl.
    CPC .............. *G06F 3/165* (2013.01); *G06F 3/167* (2013.01); *H04N 21/4532* (2013.01)

(58) Field of Classification Search
    USPC .......................................................... 700/94
    See application file for complete search history.

(56) References Cited

U.S. PATENT DOCUMENTS

| | | | |
|---|---|---|---|
| 9,275,402 B2 | 3/2016 | Zalewski | |
| 10,348,890 B2 * | 7/2019 | Yuan | ...................... H04L 67/26 |
| 2007/0198506 A1 | 8/2007 | Attaran Rezaei et al. | |
| 2007/0220552 A1 | 9/2007 | Juster et al. | |
| 2007/0265097 A1 | 11/2007 | Havukainen | |
| 2010/0158218 A1 | 6/2010 | Dhawan et al. | |
| 2010/0251279 A1 | 9/2010 | Piard et al. | |
| 2010/0332313 A1 * | 12/2010 | Miller | ................ G06Q 30/0251 705/14.55 |
| 2014/0037884 A1 | 2/2014 | Wambolt et al. | |
| 2014/0129344 A1 * | 5/2014 | Smith | ................ G06Q 30/0276 705/14.66 |

(Continued)

OTHER PUBLICATIONS

Office action for U.S. Appl. No. 14/981,090, dated Jan. 11, 2018, Wagner, "Interactive Personalized Audio", 12 pages.

(Continued)

*Primary Examiner* — Amal S Zenati

(74) *Attorney, Agent, or Firm* — Lee & Hayes, P.C.

(57) ABSTRACT

This disclosure is directed to methods, apparatuses, and systems for providing content streams with highly targeted, interactive content in a personalized manner. A content producer can generate a user-generic content stream associated with one or more user-specific content flags, which can describe how the user-specific content can be presented along with the content stream. A content-provider can purchase or otherwise acquire the rights to insert their user-specific content into another content provider's user-generic content. Both the user-specific and user-generic content can be provided to the user by means of a voice-controlled device associated with a cloud-based profile of the user. A user can interact with the personalized content to receive supplemental information.

20 Claims, 10 Drawing Sheets

(56) References Cited

U.S. PATENT DOCUMENTS

2014/0143817 A1* 5/2014 Yeh .................. H04N 21/47202
725/100
2017/0131971 A1* 5/2017 Mitchell .............. H04N 21/488

OTHER PUBLICATIONS

Office action for U.S. Appl. No. 14/981,090, dated Mar. 23, 2017, Wagner, "Interactive Personalized Audio", 9 pages.
Office action for U.S. Appl. No. 14/981,090, dated Sep. 29, 2017, Wagner, "Interactive Personalized Audio", 13 pages.

* cited by examiner

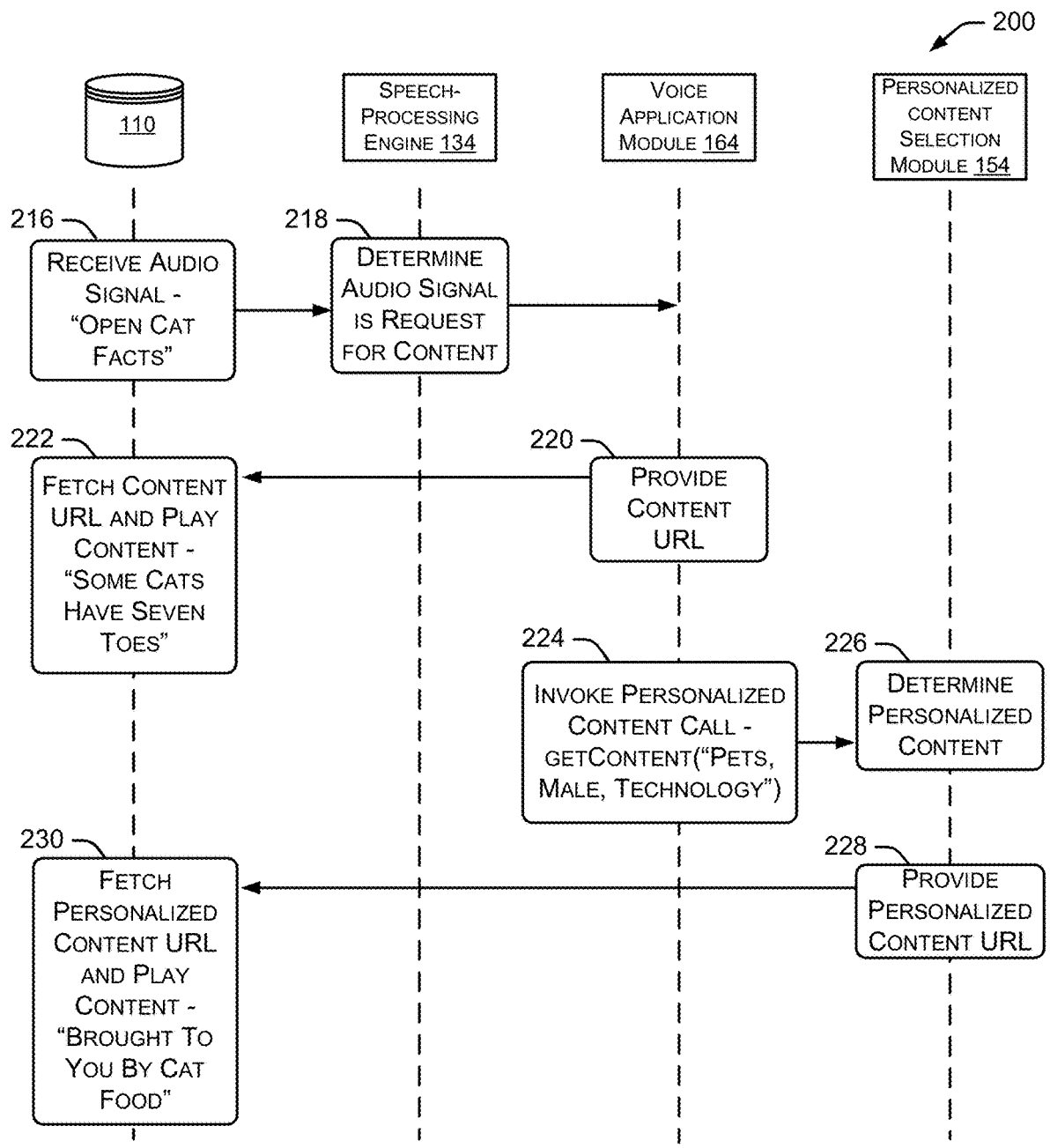
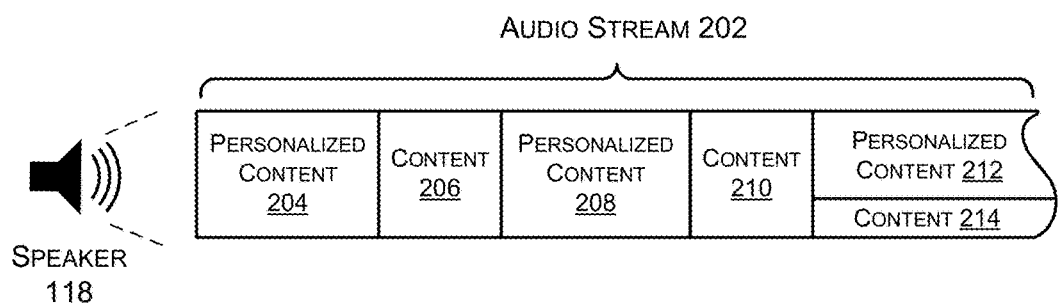
FIG. 2A

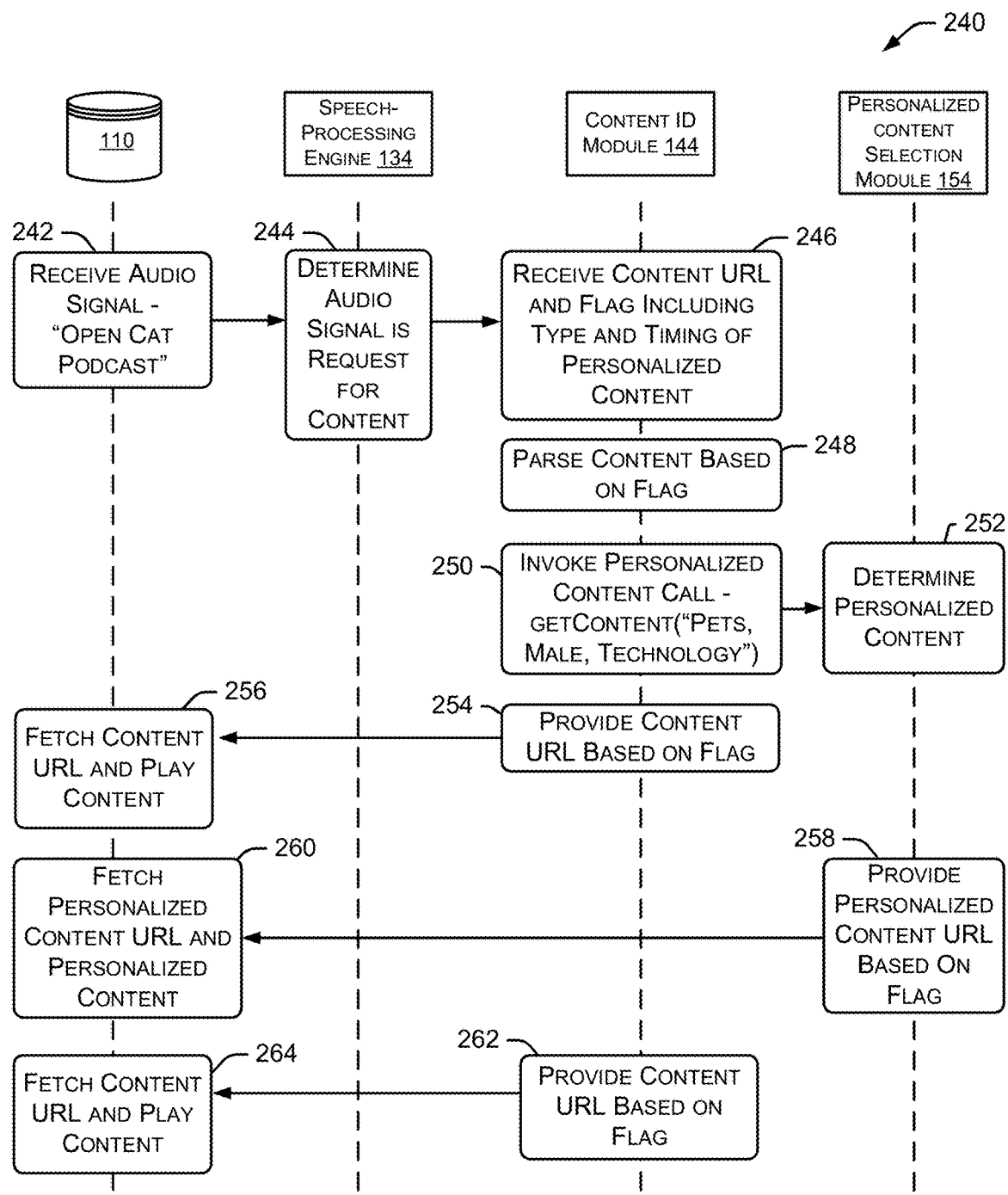
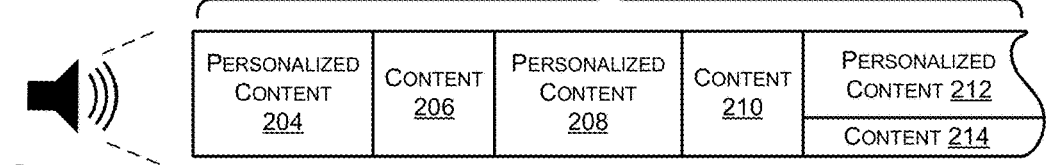
FIG. 2B

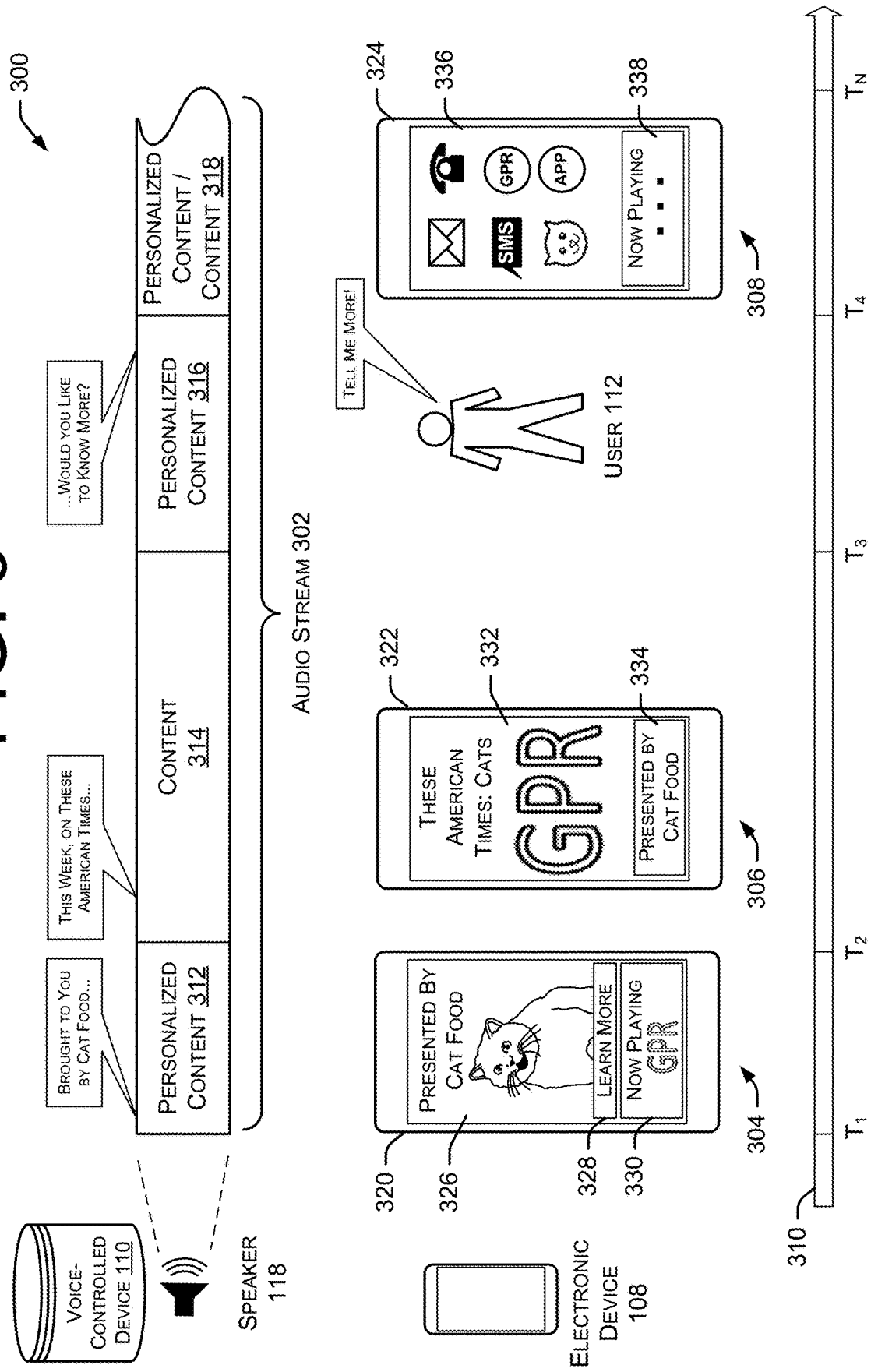

INTERACTIVE PERSONALIZED AUDIO

RELATED APPLICATIONS

This application claims priority to and is a continuation of U.S. patent application Ser. No. 14/981,090, filed on Dec. 28, 2015, the entire contents of which are incorporated herein by reference.

BACKGROUND

Personalized content can be provided in many forms, such as print, television, radio, and websites. Interactive content allows an individual to express an interest in the content and learn more about the subject of it. In some mediums, for example, it is not currently possible to interact with the content, thereby limiting an engagement of a viewer or listener.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A shows a process for providing an audio stream including content and personalized content originating from a variety of sources.

FIG. 2B shows another process for providing an audio stream including content and personalized content originating from a variety of sources.

FIG. 3 shows an illustrative interactive audio stream and an electronic device presenting interactive companion content.

DETAILED DESCRIPTION

Figure 1:
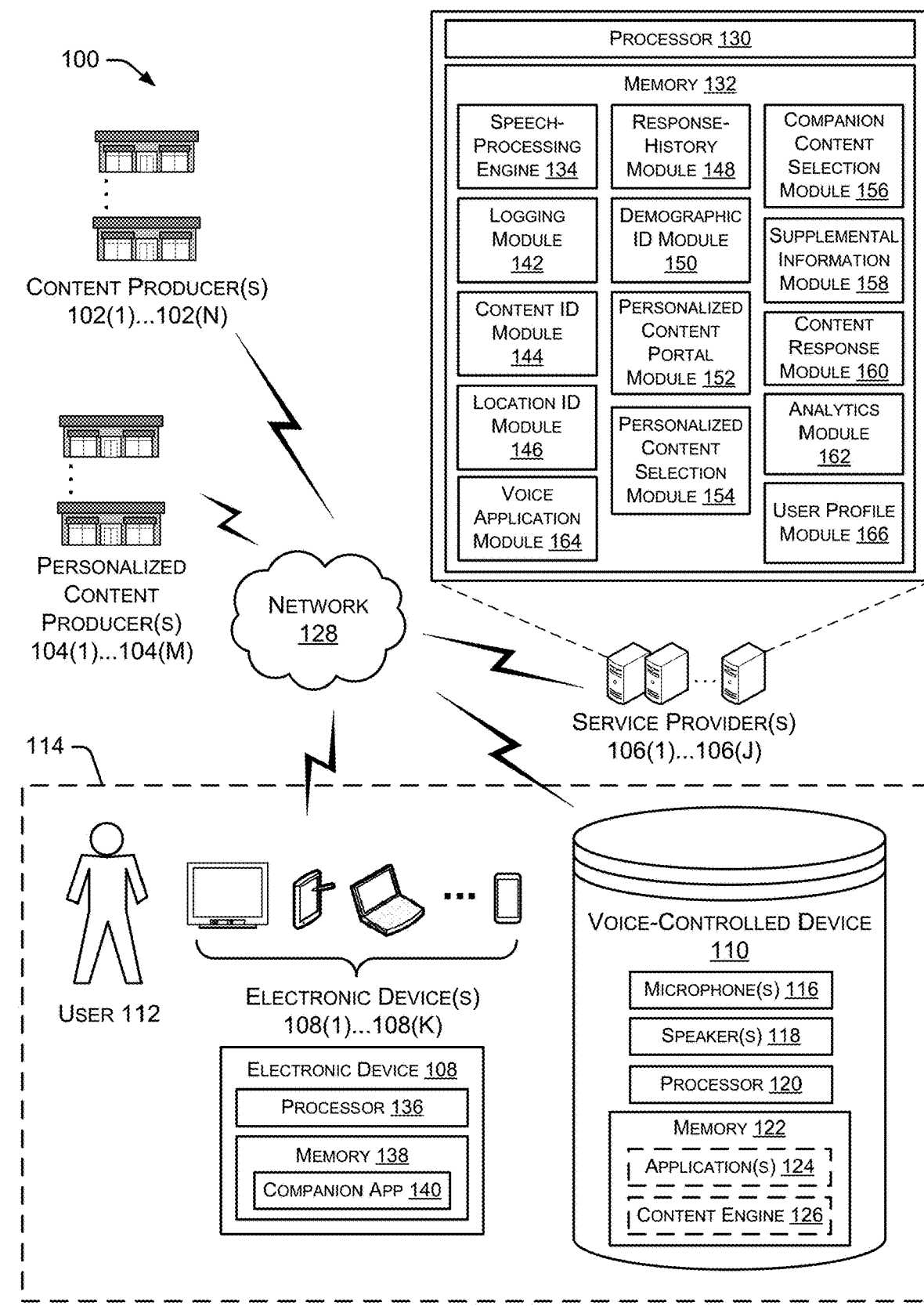
FIG. 1 shows an illustrative voice interaction computing architecture, including content producers, personalized content producers, service providers, electronic devices, and a voice-controlled device.

This disclosure describes methods, apparatuses, and systems for providing content streams with highly targeted, interactive content in a personalized manner. These content streams can be presented along with audio-only content, video-only (or image-only) content, or content that includes both audio and video, such as an audio stream associated with companion content. As described below, content streams can be provided with flags (e.g., metadata) designating how, when, and where personalized content can be provided. Personalized content can be presented within a defined time period, and can include associated companion content. A content stream and a personalized content stream can be compiled by concatenating or overlaying the streams and presenting the streams to users using Uniform Resource Locators (URLs) provided by a service provider. Companion content can be presented alongside the streams. Users can interact with the personalized content directly, or can interact with the companion content, which can be presented on multiple devices.

In some embodiments, a content stream and a personalized content stream can be presented as an audio stream via a voice-controlled device, while companion content can be presented on an electronic device in a substantially simultaneous manner. For example, a user can listen to an audio content stream and can be presented with content related to the content of the content stream and personalized based at least in part on a profile of the user/listener. The user can interact with the personalized content by issuing audio commands, such as voice commands to interrupt (e.g., stop or pause) the personalized content, or by responding to a question or audio prompt in the personalized content. The user can also interact with the personalized content via the companion content, which can be presented in a companion application ("app") on a display of an electronic device while the personalized audio content is presented via the voice-controlled device.

In response to the user interaction with the personalized content, the user can receive supplemental information in a same or different medium (e.g., as audio information, as information presented in a companion application, as an email, SMS/text message, etc.), the user can receive the supplemental information at a time proximate to the interruption (e.g., presented immediately after the interruption, or sequentially in time) or at a time removed from the interruption (e.g., at a later time so as to not interfere with the content stream, or at a later time when a user is likely to respond to the supplemental information, etc.), and/or further action can be performed (e.g., queue a product for later purchase, schedule an event, make a restaurant reservation, etc.). Furthermore, a variety of defined personalized content can be provided for a particular user based on an array of factors included in a user profile, as well as additional behavior of the user.

In some embodiments, an audio stream presented to a user can include content produced by a content producer and can include a personalized content stream produced by a personalized content producer. A service provider can provide a personalized content service to connect the content producer and the personalized content producer and to combine the streams (e.g., as an audio stream) in a personalized manner for individual users. Content streams and personalized content streams can be accessed via one or more Uniform Resources Locators (URLs) which can be provided by the service provider. The audio stream can be presented to the user on a voice-controlled device while associated companion content can be presented on an electronic device associated with the user. In some embodiments, the voice-controlled device can fetch the content stream and the personalized content streams independently of the service provider and can combine the streams or alternate between streams to generate an audio stream on the voice-controlled device. The user can interact with the audio stream and/or the companion content, and the user can be presented with supplemental information based on the user interaction. The supplemental information can be based in part on the content producers and the personalized content producer, and can be presented to the user with minimal disruption to the content of the audio stream.

Content producers include entities that produce audio content and/or video content, including but not limited to podcasts, news, sports, broadcasts, fiction, non-fiction, voice-applications, etc., and can include any pre-recorded, live, real-time, and/or streaming content. Content producers can associate a flag (e.g., metadata) with a content stream that can allocate or designate time within the content stream where personalized content can be presented, including at the beginning, middle, or end of the content stream. Content producers can indicate the overall type of content and can indicate whether personalized content can be presented serially (e.g., concatenated) or in parallel with the content (e.g., overlaying or merging the streams by attenuating the audio content and playing the personalized content over the content). Further, the content producers can indicate a maximum allowable interrupt period for personalized content, in the event that the user interacts with the personalized content, to minimize a delay in returning to the content. In the case of a voice-application, a content producer can call the personalized content by passing information indicating the overall type of content and desired target audience to a personalized content selection module, which in turn may provide personalized content based on a profile of the user and the subject content.

Personalized content producers can purchase or otherwise acquire the rights to insert their personalized (e.g., user-specific) content into another content provider's user-generic content. A personalized content producer can purchase, create, distribute, or otherwise specify personalized content, companion content, and supplemental information to be presented in connection with a content stream to a user. For example, personalized audio content can be presented via a voice-controlled device and personalized visual content can be presented in a companion application while the personalized audio content is presented to the listener. The personalized content producer can specify a type of interaction possible with the personalized audio content and/or a type of interaction possible with the companion content. The personalized content producer can further specify a target audience, such as by age range, income level, interests, gender, general subject matter, etc. The personalized content producer can receive metrics indicating the number of times that personalized content was presented, an amount of interaction from one or more listeners, etc.

The methods, apparatuses, and systems described herein can be implemented in a number of ways. Example implementations are provided below with reference to the following figures.

FIG. 1 shows an illustrative voice interaction computing architecture 100, including content producer(s) 102(1) . . . 102(N), personalized content producer(s) 104(1) . . . 104(M), service provider(s) 106(1) . . . 106(J), electronic device(s) 108(1) . . . 108(K), and a voice-controlled device 110. The architecture 100 also includes a user 112 who can interact with the electronic devices 108 and the voice-controlled device 110 in a user environment 114. In some embodiments, the user 112 may refer to instead to a user profile associated with the user 112 (e.g., if one or more persons interact with a single user profile associated with the voice-controlled device 110).

Generally, the voice-controlled device 110 has a microphone unit comprising at least one microphone 116 and a speaker unit comprising at least one speaker 118 to facilitate audio interactions with the user 112 and/or other users. In some instances, the voice-controlled device 110 is implemented without a haptic input component (e.g., keyboard, keypad, touch screen, joystick, control buttons, etc.) or a display. In certain implementations, a limited set of one or more haptic input components can be employed (e.g., a dedicated button to initiate a configuration, power on/off, etc.). Nonetheless, the primary and potentially only mode of user interaction with the voice-controlled device 110 can be through voice input and audible output. One example implementation of the voice-controlled device 110 is provided below in more detail with reference to FIG. 9.

The microphone 116 of the voice-controlled device 110 detects audio from the environment 114 where the voice-controlled device 110 is located, such as sounds uttered from the user 112. As illustrated, the voice-controlled device 110 includes a processor 120 and memory 122, which stores or otherwise has access to application(s) 124, which can include one or more speech-processing engines, voice applications, etc. As used herein, a processor can include multiple processors and/or a processor having multiple cores. The applications 124 can perform speech recognition on audio signals generated based on sound captured by the microphone, such as utterances spoken by the user 112. In some instances, the memory 122 may only include one or more URLs for accessing content and personalized content as instructed by the service provider 106. The voice-controlled device 110 can perform certain actions in response to recognizing different speech from the user 112. The user can speak predefined commands (e.g., "Awake"; "Sleep"; "Open"; "Pause"; "Repeat"; "Skip"; "More"; etc.), or can use a more casual conversation style when interacting with the device 110 (e.g., "I'd like to go to a movie. Please tell me what's playing at the local cinema."; "Please send me more information to my email."; etc.).

The voice-controlled device 110 can include a content engine 126 that can store, select, monitor, and/or determine personalized content to present to a user. For example, the content engine 126 can control the presentation of personalized content on the voice-controlled device 110 based in part on a content stream provided by the content producers 102, as is explained in connection with the various figures of this disclosure. In some instances, the voice-controlled device 110 can fetch content and/or personalized content located at URLs provided by the service provider 106. That is to say, in some embodiments, personalized content selection and scheduling may be performed only at the service provider 106.

In some instances, the voice-controlled device 110 can operate in conjunction with or can otherwise utilize the service providers 106 that are remote from the user 112, electronic devices 108, and/or the voice-controlled device 110. For instance, the voice-controlled device 110 can couple to the service providers 106 over a network 128. As illustrated, the service providers 106 can be implemented as one or more servers 106(1) . . . 106(J) and can, in some instances, form a portion of a network-accessible computing platform implemented as a computing infrastructure of processors, storage, software, data access, and so forth that is maintained and accessible via a network such as the Internet. The service providers 106 do not require end-user knowledge of the physical location and configuration of the system that delivers the services. Common expressions associated for these service providers 106 include "on-demand computing", "software as a service (SaaS)", "platform computing", "network-accessible platform", "cloud services", "data centers", and so forth.

The service providers 106 can include a processor 130 and memory 132. As illustrated, the memory 132 can store and utilize a speech-processing engine 134 for receiving audio signals from the voice-controlled device 110, recognizing speech and, potentially, causing performance of an action in response. For instance, the engine 134 can identify speech within an audio signal by performing natural language understanding (NLU) techniques on the audio signal. In addition, the engine 134 can provide audio for output on a client device (e.g., the device 110) via text-to-speech (TTS). In some examples, the voice-controlled device 110 can upload audio data to the service providers 106 for processing, given that the service providers 106 can have a computational capacity that far exceeds the computational capacity of the voice-controlled device 110. Therefore, the voice-controlled device 110 can utilize the speech-processing engine 134 for performing relatively complex analysis on audio captured from the user environment 114.

Regardless of whether the speech recognition occurs locally or remotely from the environment 114, the voice-controlled device 110 can receive vocal input from the user 112, and the device 110 and/or the service providers 106 can perform speech recognition to interpret a user's operational request or command. The requests can be for essentially any type of operation, such as database inquires, requesting and consuming entertainment (e.g., gaming, finding and playing music, movies, or other content, etc.), requesting and interacting with voice applications, requesting supplemental information related to personalized content, personal management (e.g., calendaring, note taking, etc.), online shopping, financial transactions, and so forth. In some instances, the device 110 also interacts with a client application stored on one or more client devices associated with the user profile of the user 112, such as the electronic devices 108. As illustrated, the electronic device 108 includes a processor 136 and memory 138, which stores a companion application 140.

In some instances, the user 112 can also interact with the device 110 through this "companion application" 140. For instance, the user 112 can utilize a graphical user interface (GUI) of the companion application displayed on the electronic device 108 (or any other client device) to make requests to the device 110 in lieu of voice commands. Additionally or alternatively, the device 110 can communicate with the companion application to present information to the user 112, such as previous voice commands provided to the device 110 by the user (and how the device interpreted these commands), content that is supplementary to a voice command issued by the user (e.g., cover art for a song playing on the device 110 as requested by the user 112), personalized content (including companion content presented substantially simultaneously with the personalized content), and the like. In addition, in some instances the device 110 can send an authorization request to a companion application in response to receiving a voice command, such that the device 110 does not comply with the voice command until receiving permission in the form of a user response received via the companion application.

The voice-controlled device 110 can communicatively couple to the network 128 via wired technologies (e.g., wires, USB, fiber optic cable, etc.), wireless technologies (e.g., Wi-Fi, RF, cellular, satellite, Bluetooth, etc.), or other connection technologies. The network 128 is representative of any type of communication network, including data and/or voice network, and can be implemented using wired infrastructure (e.g., cable, CAT5, fiber optic cable, etc.), a wireless infrastructure (e.g., Wi-Fi, RF, cellular, microwave, satellite, Bluetooth, etc.), and/or other connection technologies.

In addition to receiving and responding to voice commands from the user (via the voice-controlled device 110), the remote computing resources can generate, select, and/or provide personalized content based on the user profile of the user 112. That is, the service providers 106 can identify metrics associated with the user profile (e.g., demographic information, previous purchases, etc.) and can select personalized content to present to the user based on a correlation between the personalized content and the metrics of the user profile. In addition, the user 112 can utilize the voice-controlled device 110, the electronic devices 108, and/or other client devices of the user 112 to respond to the personalized content. For example, the responses can include a request for additional information regarding a product referenced in the personalized content, a request to acquire the item referenced in the personalized content, feedback regarding whether or not the a user associated with the devices found the personalized content interesting or helpful, a request for additional news information, a request to update additional services associated with the user profile (such as a calendar), or the like.

As illustrated, the memory 132 of the service providers 106 has access to a logging module 142, a content identification (ID) module 144, a location ID module 146, a response-history module 148, a demographic ID module 150, a personalized content portal module 152, a personalized content selection module 154, a companion content selection module 156, a supplemental information module 158, a content response module 160, an analytics module 162, a voice application module 164, and a user profile module 166. At a high level, the personalized content selection module 154 can select personalized content to output to the user 112 based on an array of information associated with the user profile of the user 112, and/or based on a type of content provided by the content producers 102. The companion content selection module 156 can select companion content to be presented to the user 112 via the electronic devices 106, whereby the companion content can be associated with the personalized content selected by the personalized content selection module 154. The content response module 160 can receive a user interaction associated with the personalized content or the companion content, and performs an action based on receiving a response from the user pertaining to the content. For instance, the module 160 can provide supplemental information to the user via the supplemental information module 158, can purchase an item for the user 112, can provide additional information regarding an item, or can otherwise comply with other responses determined from audio signals generated from audio captured by a device associated with the user profile of the user 112. Further, the voice application module 164 can store one or more voice applications that may provide content via the voice-controlled device 110. For example, the voice application module 164 can provide interactive, voice-controlled programs or applications that provided information, entertainment, news, etc., to the voice-controlled device 110. The user profile module 116 can provide a single repository compiling information associated with a user profile of the user 112, for example. The user profile module 166 can include information relating to the account of the user 112, content consumed, products purchased, transaction history, demographic information, etc. The user profile module 166 can include some or all of the information described in connection with the various modules of the service provider 106.

In order to provide content that is personalized or otherwise selected for the user profile associated with the user 112, the service providers 106 can reference past behavior associated with the user profile, which the logging module 142 can log and can store in the user profile module 166. This past behavior can include past purchases made in connection with the user profile, a browsing history associated with the user profile on an array of client devices, demographic information of the user profile, interests associated with the user profile, content previously consumed by the user profile (including content being consumed by the user profile of the user 112 in real-time), responses associated with the user profile of the user 112 to personalized content previously presented to the user profile of the user 112, a geo-location associated with the user profile (either generally or at a particular time), and/or any other type of behavior or information otherwise associated with the user profile. Additionally, the service provider 106 can select personalized content for a user profile associated with the user 112 based on a match between the user profile information, demographics of the user profile, etc., and the information provided by the personalized content producers 104 for the desired target audience.

When storing this data, the logging module 142 can store an indication of the content accessed/consumed by the user profile associated with the user 112, a time at which the user profile accessed the content, and the like. The logging module 142 can obtain this information from an array of sources. For instance, if a user profile utilizes client devices associated with a common entity (e.g., a common vendor that provides the devices, a common service provider that provides services across the devices, etc.), then the common entity can collectively aggregate and store this information, such as the content viewed by the user profile, the device on which the user profile accessed the content, a time and date at which the user profile accessed the content, a length for which the user profile viewed the content, and the like.

The content ID module 144 can function to identify content previously consumed by the user profile. This can include referencing a user account of the user at internet radio service provider(s) to identify music or audio books listened to by the user account of the user 112, referencing a user account at video-based or television-based service provider(s) to identify video content consumed by the user account of the user 112, referencing a user account at service provider(s) that provide electronic books (e.g., news articles, novels, etc.) to determine eBooks consumed by the user account, and the like. For example, the content ID module 144 can request, from the user profile, credentials of the user profile associated with one or more of these accounts. The module 144 can then utilize these credentials to sign into the user's account and query, from the service(s), the information referenced above, such as content previously consumed by the user profile associated with the user 112. The content ID module 144 can then provide this information to the logging module 142 such that the logging module 142 can store this information for later use by the personalized content selection module 154 and the companion content selection module 156 when selecting personalized content for the user profile associated with the user 112.

Further, the content ID module 144 can function to identify content to be consumed by the user profile associated with the user 112, such as a content stream from the content producers 102. As described in connection with FIGS. 2A and 2B, below, the content stream can include a flag that identifies a type of personalized content that can be presented in connection with the content stream. The content ID module 144 can then provide this information to the logging module 142 such that the logging module 142 can store this information for later use by the personalized content selection module 154 and the companion content selection module 156 when selecting personalized content for the user profile associated with the user 112. Further, the content ID module 144 can provide a URL to the voice-controlled device 110 so that the device 110 can access the content located at the URL, and the content ID module 144 can make a function call to the personalized content selection module 154 to select personalized content relevant to the content (and/or may make a function call to the companion content selection module 156 or supplemental information module 158), based on input from the devices associated with the user profile of the user 112 and/or various modules discussed herein.

The location ID module 146, meanwhile, can function to identify a location of the devices associated with a user profile of the user 112 for use in selecting personalized content for output to one or more devices associated with the user profile of the user 112. In some instances, this location comprises a geo-location (e.g., a city and state of associated with the user profile of the user 112) determined from demographic information associated with the user 112 and determined from a user profile of the user 112 at the service providers 106, such as from the user profile module 166. For example, the user can have previously indicated, within the user profile module 166, the current city and state of the user. The location ID module 146 can then reference this information in determining personalized content to provide to the devices associated with the user profile of the user 112. In other instances, the location ID module 146 can determine a more fine-grain location of the devices associated with a user profile of the user 112, such as whether the devices associated with the user profile of the user 112 are currently at his or her home, office, in the car, etc. The module 146 can identify this location in a number of ways. For instance, the location ID module 146 can reference a reported location of a client device associated with the user profile of the user 112 (e.g., the electronic device 106, a mobile phone of the user 112, etc.), which can be determined using GPS coordinates, triangulation techniques, or the like. In another example, in instances where the voice-controlled device 110 is generally fixed (e.g., within the user's home or office), the location ID module 146 can determine that the user is at home (or at the office) when the speech-processing engine 134 identifies speech of the user 112. In some embodiments, the speech-processing engine 134 can identify particular users associated with a user profile.

The response-history module 148, meanwhile, can identify responses associated with the user profile of the user 112 to prior personalized content provided to the user profile associated with the user 112. This can include how the user profile associated with user 112 responded to personalized content of different formats (e.g., audio only, video only, audio/video), how the user profile associated with the user 112 responded to personalized audio content compared to companion content, how the user profile associated with the user 112 responded to personalized content on different client devices, at different locations, at different times, and the like. Again, the logging module 142 can log this information for later use when selecting personalized content to provide to one or more devices associated with a user profile of the user 112.

The demographic ID module 150 can function to identify demographic information of the user 112 for use in selecting personalized content for the user profile of the user 112. This can include, for a particular user profile, an age, gender, income level, number and age of family members, occupation, and other demographic information used to select personalized content.

The personalized content portal module 152 can function to interact with the personalized content producers 104 to facilitate the purchasing of the rights to insert their personalized content into another content producer user-generic content. For example, the personalized content module 152 can receive personalized content, companion content, supplemental information, and target demographics from the personalized content producer 104. The personalized content producers 104 can indicate when the personalized content and companion content are to be provided, as well as the type of user interaction to be received in response to the personalized content and/or companion content, such as a presentation of supplemental information. As described in connection with the various figures in the disclosure, the personalized content portal module 152 allows the personalized content producers 104 to interface with the service providers 106 to initiate a presentation of personalized content, companion content, and supplemental information to one or more devices associated with a user profile of the user 112.

After the logging module 142 logs information provided by the afore-mentioned modules, and after personalized content and associated information is provided to the service providers 106 via the personalized content portal module 152, the personalized content selection module 154 can select personalized content to provide to a device associated with a user profile associated with the user 112 that are highly targeted to the user profile associated with the user 112. For example, the personalized content module 154 can determine a content type indicated in a flag, and may search the user profile associated with the user 112 to determine the demographic information associated with the user profile. The module 154 may further determine that a personalized content matches the personalized content type indicated in the flag and matches the demographic information associated with the user profile. In some instances, a plurality of personalized content can match the indications in the flag and specifics associated with the user profile. In this case, the personalized content can be ranked such that personalized content with a higher ranking (or priority) can be provided to the voice-controlled device 110 before personalized content with a lower ranking. As may be apparent in the context of this disclosure, personalized content can be ranked according to a relevancy with the user profile. In some instances, the ranking of the personalized content can be weighted according to an amount of revenue to be generated when the personalized content is to be presented. In some instances, rankings of the personalized content can vary according to a relevance to customer's profile, money paid by a personalized content provider, relevance to user-generic content, etc. In some instances, the module 154 can select personalized content based on the ranking of the personalized content as it relates to a specific user profile.

In some instances, after being invoked by the content ID module 144, for example, the personalized content selection module 154 can provide a URL for personalized content to the voice-controlled device 110 so that personalized content may be presented at the device 110. Further, the companion content selection module 156 can select companion content to provide to the user (e.g., via the companion app 140 of the electronic devices 108 associated with the user profile of the user 112), and the supplemental information module 158 can provide supplemental information to the user 112 in response to a user interaction with the personalized content and/or with the companion application 140. Further, the supplemental information provided by the supplemental information module 158 can be based in part on information provided by the logging module 142, for example, such as information that the user profile associated with the user 112 responds to one form of supplemental information over another.

The analytics module 162 can gather statistics and information on the personalized content, companion content, and supplemental information provided to the user profile associated with the user 112. For example, for each personalized content, the analytics module 162 can monitor and record the content streams in which the personalized content streams are presented, a level of user interaction with a personalized content stream and/or companion content, the supplemental information presented, the demographics of the user profiles the personalized content is presented to, response rates, additional actions associated with various user profiles (e.g., purchasing a product, booking a reservation, etc.), a number of times the personalized content stream was presented, etc.

The voice application module 164 can include applications generated and/or provided by the content producers 102, and can include one or more applications to be operated in conjunction with the voice-controlled device 110. For example, the voice-application module 164 can include an application that provides "Cat Facts" when queried by a user. As may be understood in the context of this disclosure, the voice application module can include applications of any scope. The user profile module 166 can provide a data store including some or all of the information associated with a user profile of the user 112.

FIGS. 2A, 2B, and 4-8 illustrate example processes in accordance with embodiments of the disclosure. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media can include non-transitory computer-readable storage media, which can include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIG. 2A shows a process 200 for generating and providing an audio stream 202 including content and personalized content originating from a variety of sources. For example, content can be provided by the content producers 102, and personalized content can be provided by the service providers 106 and/or by the personalized content producers 104. Content streams and personalized content streams can be provided to the voice-controlled device 110 as URLs which have been selected and scheduled by the components at the service provider 106.

In some instances, the audio stream 202 can be output from the speaker 118 of the voice-controlled device 110. The audio stream 202 can include any number of personalized content segments 204, 208, and 212 (also referred to as "personalized content streams", "personalized content", or "personalized audio content streams"), and can include any number of content 206, 210, and 214 (also referred to as "content streams"). As can be understood in the context of this disclosure, the content 206, 210, and 214 can include content provided by a voice application, on-demand content, live content, podcasts, etc. In some instances, the personalized content 204, 208, and 212 can include an advertisement. The audio stream 202 can be generated in accordance with the process 200 described herein.

At 216, the voice-controlled device 110 can receive an audio signal via the microphone 116. In the example illustrated in FIG. 2B, the audio signal voiced by the user can include the command "Open Cat Facts". At 218, the audio signal is transmitted to the speech-processing engine 134 at the service provider 106 where the operation 218 determines whether the audio signal is a request for content. This operation 218 performed by the speech-processing module 134 can include an Automatic Speech Recognition ("ASR") module that recognizes phonemes within the audio signal to determine words within the audio signal. The ASR may provide the recognized words to a Natural Language Understanding ("NLU") module that determines the meaning of the words in the audio signal, and upon determining the meaning of the audio signal, such as that the audio signal is a request for content, may provide the request to the voice application module 164 as illustrated in FIG. 2A.

At 220, the voice application module 164 can provide a content URL to the voice-controlled device 110, based on the programming and function desired by the voice application. For example, a weather application can provide weather information via the voice-controlled device 110; a quote application can provide famous quotes via the voice-controlled device 110; a taxi application may hail a taxi for the user 112 via the voice-controlled device; etc. As may be understood in the context of this disclosure, the content URL provided in the operation 220 may be based on one or more user interactions with the voice application operating on the voice-controlled device 110.

At 222, the voice-controlled device can use the URL provided by the voice-application module 164 to fetch the content located at the URL and play the content on the device 110. For example, in the example where the voice application is a "Cat Facts" application, the content played by the device 110 may include a fact that "Some cats have seven toes". Based on the operation of the voice application, the user may interact with the voice application, and response may be provided according to a decision tree, for example. At a time when personalized audio content is to be presented via the voice-controlled device 110, the voice application module 164 can invoke a personalized content call at operation 224 to provide personalized content to the device 110.

For example, the operation 224 may invoke a personalized content call such as "getContent('Pets, Male, Technology')", which would pass information to the personalized content selection module 154 to be used in selecting the personalized content. For example, the personalized content call in the operation 224 can include any information, such as target demographic information, content subject, maximum personalized content length, etc. At the operation 226, the personalized content selection module 154 can determine personalized content based on the information provided in the personalized content call. In some instances, the operation 224 can call personalized content pre-cached on the service provider 106, such for personalized content to be specifically presented to the user profile of the user 112 associated with the device 110.

At 228, the personalized content selection module 154 can provide a personalized content URL to the voice-controlled device 110, and at operation 230, the device 110 can fetch the personalized content URL provided by the service provider 106 and can play the personalized content, such as "Brought to you by Cat Food." As may be understood in the context of this disclosure, the personalized content presented in the operation 230 can be interactive personalized content and/or may be presented along with companion content on an associated electronic device. Further, the process 200 can include any number of audio signals, content URLs, and personalized content URLs, as may be understood in the context of this disclosure. Content URLs and/or personalized content URLs can be provided to the voice-controlled device 110 based on personalized content function calls, requests from users, and flags, as discussed herein.

In some instances, the service provider 106 can provide the personalized content to the voice-controlled device 110 by inserting the personalized content at the URL associated with the content. That is to say, the content and personalized content can be provided via the same URL, with the content switching taking place at the service provider 106.

FIG. 2B shows another process 240 for providing the audio stream 202 including content and personalized content originating from a variety of sources. As can be understood in the context of this disclosure, the content 206, 210, and 214 can include content provided by a voice application, on-demand content, live content, podcasts, etc. The audio stream 202 can be generated in accordance with the process 240 described herein.

At 242, the voice-controlled device 110 can receive an audio signal, and at 244, the speech-processing engine 134 can determine if the audio signal is a request for content. For example, the operations 242 and 244 may operate similarly to the description provided with the operations 216 and 218, respectively. In this example, the user 112 can speak "Open cat podcast," which may initiate the process to play a podcast with cats as the subject.

At 246, based on the request provided in the operation 242, the content ID module 144 can receive the content URL with an associated flag, with the flag including metadata on the type and timing of personalized content to be presented during the content. The flag can indicate that personalized content can be presented along with the content, and can include an array of information related to presenting personalized content in connection with the content. For example, the flag can be added by the content producer 102 to indicate how many personalized content segments can be presented along with the content, when the personalized content can be presented (e.g., at the beginning, middle, or end of the content), the length or size of the personalized content (e.g., measured in minutes or seconds), how the personalized content can be presented (e.g., serially or in parallel), whether a user interaction can interrupt the presentation of the content, etc. The flag can also include metadata reflecting the topic or general category of the content, for example, to allow the service provider 106 to provide the personalized content based on the content and preferences/profile of the user.

At 248 the content ID module 144 parses the content based on the flag, which may include determining when and where the content is to be segmented, divided, or split into distinct content portions 206, 210, and 214, for example. In some instances, the content ID module determines the scheduling of URLs to be sent to the voice-controlled device 110, on the basis of the information provided in the flag. In some instances, content provided by the content provider 106 can be segmented in the operation 248 and each portion of content can be assigned a unique URL, so that the content and personalized content can be scheduled and presenting by providing URLs in series to the voice-controlled device.

For example, if the flag indicates that personalized content can be pre-rolled (i.e., the personalized content 204 is to be presented before the content 206), the service providers 106 can invoke a personalized content call (such as in operation 250) to provide personalized content to the device 110, or can provide a pre-cached personalized content URL to the device 110. In some embodiments, the voice-controlled device 110 can select pre-cached personalized content stored on the voice-controlled device 110 to minimize a delay in presenting personalized content before presenting the content 212. In some embodiments the personalized content 204 can be pre-cached at the service provider 106 in a personalized content queue associated with the user profile of the user 112. It can be understood in the context of this disclosure that personalized content can also be provided by the service provider 106 and/or the personalized content producers 104. As the personalized content call is invoked in the operation 250 (e.g., with a function call "getContent ('Pets, Male, Technology')"), the personalized content selection module 252 can determine personalized content based on the user demographics, location, previously consumed content, purchase history, etc. associated with the user profile of the user 112.

At 254, depending on the timing of personalized content indicated in a flag associated with a content stream, the operation provides the content URL to the voice-controlled device 110. At 256, the device 110 fetches the content at the URL and plays the content. As may be understood in the context of this disclosure (e.g., in FIG. 3, below), information about the content can be presented on an electronic device associated with the device 110, and/or companion content can be presented via the electronic device.

At 258, the personalized content selection module can provide a URL to the device based on the flag. For example, the operation 258 can provide a personalized content URL to the device 110 for the personalized content (e.g., 208) to be played at the device 110 (operation 260) after the segment of content (e.g., 206) has been completed. In some instances, the personalized content URL can be fetched and provided to the device 110 based on a user interaction with the voice-controlled device 110 and/or the electronic device 108, as discussed in connection with FIG. 3. In some instances, individual personalized content segments can have a unique personalized content URL such that passing the personalized content URL to the voice-controlled device allows the personalized content to be played after the content is finished.

In some instances, the process 240 can provide a single URL to the device 110, with the content and personalized content ordered and scheduled within a single stream at the service provider 106.

At 262, the operation can provide another content URL to the device 110 to play another content segment, such as the content 210 to be played at operation 264 after the personalized content 208, for example.

In some embodiments, the personalized content 212 and the content 214 are illustrated as being presented in parallel in the audio stream 202. In some instances, this can indicate that the content 214 can be attenuated (e.g., reduced in volume) and the personalized content 212 can be laid over or played over the content 214. That is to say, the device 110 can play content associated with two URLs at a same time, in accordance with the flag, as described herein.

In some embodiments, the content producers 102 can be agnostic about the personalized content presented along with the content streams 206. That is to say, in various instances, the content producers 102 need only to specify that personalized content can be presented, along with the parameters associated with the personalized content such as the number of personalized content segments, duration, etc., and the service providers 106 will match the personalized content 204 with the content 206 within the defined parameters. In this manner, the illustrative voice interaction computing architecture 200 allows a content producer 102 to monetize the content stream 206 without requiring the content producer 102 to develop its own personalized content platform.

FIG. 3 shows another illustrative voice interaction computing architecture 300 including an illustrative interactive audio stream 302 and an electronic device 108 presenting interactive companion content 304 and 306 and supplemental information 308. As can be understood in the context of FIG. 3, the audio stream 302, the companion content 304 and 306, and the supplemental information 308 can be presented along an axis of time 310, at various times $T_1$, $T_2$, $T_3$, $T_4$, and $T_N$.

The audio stream 302 can be similar to the audio stream 202 of FIG. 2, and can include personalized content 312, content 314, and personalized content 316, which can be followed by additional personalized content/content 318.

The interactive companion content 304 and 306 and the supplemental information 308 can be presented on the electronic device 108, illustrated as electronic device 320 at time $T_1$ along the time axis 310, as electronic device 322 at time $T_2$ along the time axis 310, and as electronic device 324 at time $T_4$ along the time axis 310. As can be understood in the context of this disclosure, any combination of content, personalized content, companion content, and supplemental information can be presented to the user profile associated with the user 112. In various embodiments, the personalized content 312, 316, and 318, and the companion content 304 and 306 can be based in part on the content 314 and 318, while the supplemental information 308 can be based in part on user interaction with the personalized content 312, 316, and 318 and/or companion content 304 and 306, as well as the response defined by the personalized content producers 104.

Turning back to the audio stream 302, at time $T_1$, the personalized content 312 is presented via the speaker 118. In this example, the personalized content 312 can be a pre-roll personalized audio content (such as "Brought to you by Cat Food . . . "), which is presented before the content 314. As can be understood in the context of this disclosure, the personalized content 312 can be a pre-cached personalized content associated with the user profile of the user 112, or can be provided in real-time from the service provider 106 or the personalized content producer 104, as described in connection with FIGS. 2A and 2B. While the personalized content 312 is presented to one or more devices associated with the user profile of the user 112, companion content 326 can be presented on the electronic device 320. For example, the companion content 326 can include visual personalized content as well as an input zone 328 that the user 112 can select to receive supplemental information. For example, if the user 112 interacts with the input zone 328, the electronic device can transmit an indication to the service provider 106 and/or the voice-controlled device 110 to present supplemental information in accordance with the flags and/or the personalized content streams. While the companion content 326 is presented on the electronic device 320, the electronic device 320 can provide an indication 330 of the content associated with the personalized content 312, such as the content 314.

At time $T_2$, the content 314 can be presented after the personalized content 312 has concluded. In this example, the content 314 includes an audio program (such as an audio program entitled "These American Times: Cats"). Also at $T_2$, the electronic device 322 can present an information screen 332 indicating information relevant to the content 314, such as the title of the program (e.g., "These American Times: Cats") and the title of the show (e.g., "GPR", which can correspond to "Generic Public Radio"). Further, the electronic device 322 can present companion content 334 while the content 314 is presented. In some embodiments, the companion content 334 can correspond to personalized content presented at time $T_1$, or can correspond to personalized content presented at time $T_3$, for example. In some instances, the companion content 334 can be presented via the electronic device 108, and personalized audio content can be presented only in response to a user interaction with the companion content 334. That is to say, in some instances, personalized audio content is only presented in response to a user interaction with the companion content 334.

At time $T_3$, the personalized content 316 can be presented by the speaker 118 of the voice-controlled device 110. As can be understood in the context of the disclosure, companion content similar to the companion content 304 can be presented in the electronic device 108 at time $T_3$. The personalized content 316 can include an express prompt (e.g., "Would you like to know more?") asking the user 112 whether he or she wishes to know more about the personalized content 316. The user 112 can respond verbally with an indication or voice command (e.g., by saying "Tell me more!"). In some instances, the user 112 can respond by interacting with companion content presented on the electronic device instead of or in addition to verbally responding to the personalized audio content. In some embodiments, a user can interrupt the personalized content 312, 316, and 318 without being prompted by the personalized content. For example, the user can sua sponte interrupt the personalized content and request supplemental information.

In some embodiments, when a user 112 interrupts the personalized content 316 (e.g., by saying "Tell me more!", or by interacting with companion content), the personalized content can be extended, thereby delaying the presentation of subsequent content. For example, if a user requests supplemental information, the supplemental information can be presented as additional personalized audio content, such as the personalized content 318. In some instances, a flag can indicate whether the content can be delayed by additional personalized content presented as supplemental information. In some instances, a flag can indicate that the content cannot be delayed by an additional personalized audio content stream, in which case, the content 318 would be presented after the personalized content 316.

Examples of supplemental information are illustrated as the supplemental information 308 presented on the electronic device 324 at time $T_4$. For example, supplemental information 336 is illustrated as the various icons in FIG. 3, and can include, but is not limited to, an email, a telephone call, an SMS/MMS (Short Message Service/Multimedia Messaging Service, i.e., a text message), and/or can be presented in an application associated with the content stream (e.g., indicated by the icon "GPR" on the electronic device 324), can be presented in an application associated with the personalized content (e.g., indicated by the cat icon on the electronic device 324), or can be presented in a separate application (e.g., indicated by the icon "APP" on the electronic device 324). In some instances, the electronic device 324 can present information about the content and/or personalized content being presented as the information 338 (indicating "Now Playing . . . ").

In some embodiments, a content producer 102 can be compensated for allowing personalized content to be provided alongside the content 314. In some embodiments, the content producer 102 can be compensated at a first rate when personalized content and/or when companion content is presented to the user (e.g., as the personalized content 312 and the companion content 304), and the content producer 102 can be compensated at a second rate (e.g., higher than the first rate or in addition to the first rate) when the user 112 interacts with the personalized content (such as through voice-interaction or by interacting with the companion content).

As can be further understood in the context of this disclosure, a user interaction with the personalized content 312, 316, and 318 can include additional actions such as purchasing an item featured in the ad, placing the item in a purchasing queue, scheduling an appointment or reservation featured in the personalized content, requesting information about news, requesting information about weather, etc.

Figure 4:
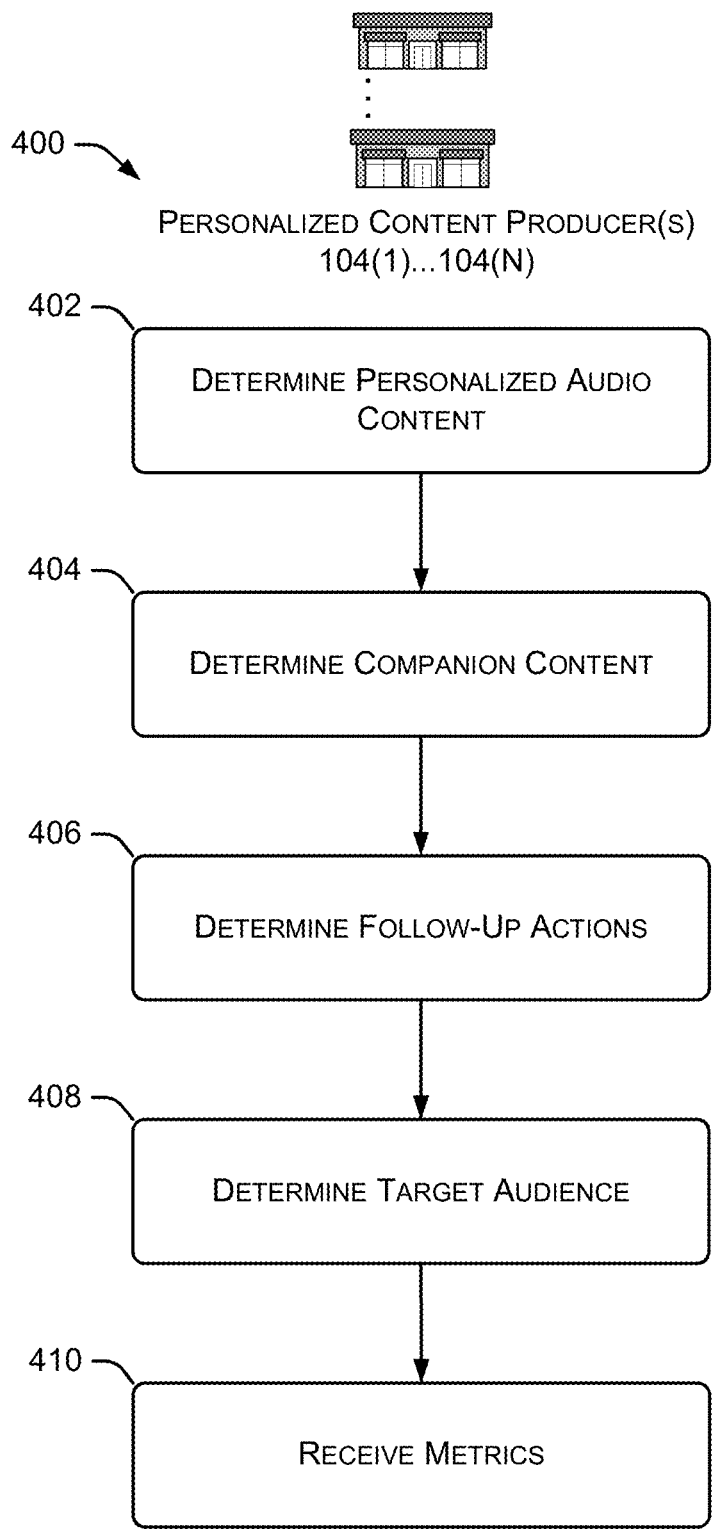
FIG. 4 illustrates a process for creating personalized content including determining personalized content and companion content.

FIG. 4 illustrates a process 400 for creating personalized content including determining personalized audio content and companion content. For example, the process 400 can be performed by the personalized content producers 104 via the personalized content portal module 152, as illustrated in FIG. 1.

At 402, the operation includes determining personalized audio content. In some instances, the operation 402 can include uploading personalized audio content to the service provider 106, while in some instances, the operation 402 can include uploading or inputting text to be translated into personalized audio content (e.g., using a text-to-speech function of the service provider 106). In some embodiments, the operation 402 can include determining that the personalized audio content complies with a set length of a personalized audio content (e.g., such as 10 seconds, 15, seconds, 30 seconds, etc.). As can be understood in the context of the disclosure, the service provider 106 can provide various templates that the personalized content producer 104 can use to determine the personalized audio content in the operation 402.

At 404, the operation includes determining companion content to be associated with the personalized audio content determined in the operation 402. Turning to the illustrative example in FIG. 3, the personalized audio content 312 can include the language "Brought to you by Cat Food . . . ", while the companion content 304 can include an illustration of a cat and the phrase "Presented By Cat Food." In this manner, the personalized audio content and the companion content provide multiple mediums to reach the user 112, and provide multiple avenues for the user 112 to interact with the personalized content.

At 406, the operation includes determining follow-up actions. For example, the operation 406 can include determining what actions to be taken when a user 112 interacts with the personalized audio content, the companion content, or both. For example, the operation 406 can include defining any number of follow-up actions, such as emailing a user 112 a link to an item or service, providing a SMS/MMS (text message), extending the personalized content with additional personalized audio content or additional companion content, etc.

At 408, the operation includes determining a target audience. For example, this can include defining demographics of the audience that the personalized content producer 104 wishes to target with the personalized content. For example, demographics of the target audience can include, but is not limited to, age range, income level, interests, gender, number and age of family members, occupation, education level, etc. Further, the operation 408 can include determining a general subject matter of the content (such as the content 314) in which the personalized content producer 104 would like the personalized content to be presented.

As can be understood in the context of this disclosure, the information provided in the operations 402, 404, 406, and 408 can be provided to the service provider 106 when purchasing or acquiring rights for personalized content to be presented to one or more user profiles (such as the user profile associated with the user 112), as described herein. As may be further understood in the context of this disclosure, one or more URLs associated with the personalized audio content, companion content, and/or follow-up actions can be provided by the personalized content producers 104 and/or can be generated by the service provider 106 when hosting the personalized content.

At 410, the operation includes receiving metrics, thereby providing information about the personalized content presentations and user interactions with the personalized content by the user 112. For example, the metrics can include, but are not limited to: a number of times a personalized content was presented; when the personalized content was presented; who the personalized content was presented to; an amount of interaction from one or more listeners; a type of interaction (e.g., with personalized audio content or companion content); a type of content the personalized content was presented alongside; a number of times a personalized content segment was skipped, dismissed, paused, or repeated; etc.

Figure 5:
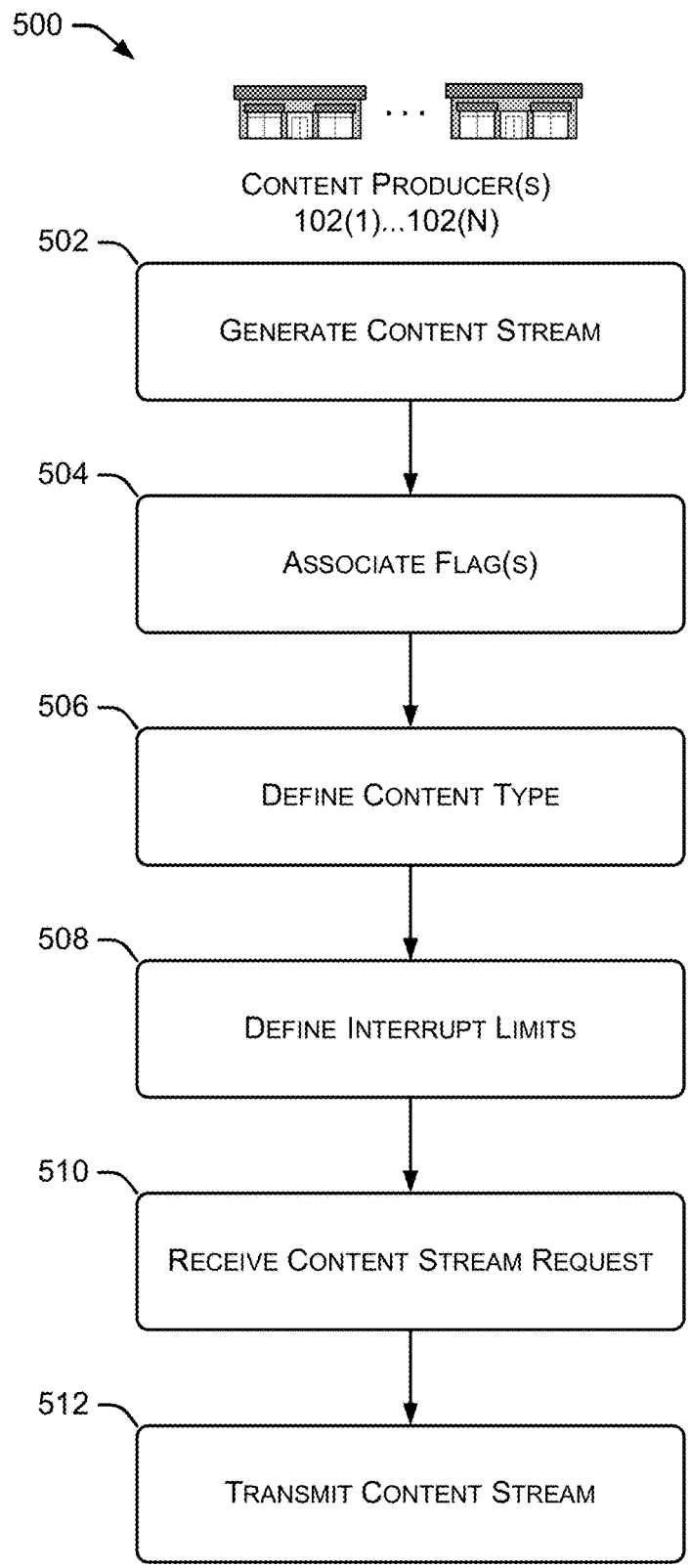
FIG. 5 illustrates a process for generating a content stream including flags indicating that personalized content can be presented along with the content stream.

FIG. 5 illustrates a process 500 for generating a content stream including flags indicating that personalized content can be presented along with the content stream. For example, the process 500 can be performed by the content producers 102 to be distributed to the service providers 106 and/or the voice-controlled device 110, as illustrated in FIG. 1.

At 502, the operation includes generating a content stream. For example, the content stream can include but is not limited to podcasts, news, sports, broadcasts, fiction, non-fiction, etc., and can include any pre-recorded, live, real-time, and/or streaming content.

At 504, the operation includes associating one or more flags with the content stream generated in the operation 502. For example, the flags can indicate how many personalized content segments can be presented along with the content stream, when or where in the content stream that the personalized content segments can be presented (e.g., at the beginning, middle, or end of the content), the length or size of the personalized content segments (e.g., measured in minutes or seconds), how the personalized content segments can be presented (e.g., serially or in parallel), whether a user interaction can interrupt the presentation of the content, etc. The flags associated in the operation 504 can correspond to the flag described in connection with FIGS. 2A and 2B, for example.

At 506, the operation includes defining a content type of the content stream. For example, the content type can reflect the topic or general category of the content stream, for example, to allow the service provider 106 to provide personalized content based on the content and preferences/profile of the user. The content type determined in the operation 506 can be included in the flags provided in the operation 504.

At 508, the operation includes defining interrupt limits of the content stream. For example, as described in connection with the figures of this disclosure, a user can interrupt personalized content to request supplemental information. In some embodiments, the content producer 102 can indicate that the content stream can be delayed or postponed so that the supplemental information can be presented immediately in response to the user interrupt. However, the content producer 102 can limit an amount of a delay or postponement of the content in the operation 508. For example, the content producer 102 can define an additional interrupt of 10 seconds or 20 seconds, as a non-limiting example. In some embodiments, the content producer 102 can receive additional revenue by allowing a variety of interrupts within a content stream, thereby incentivizing the content producer 102 to allow interrupts within the content stream.

At 510, the operation can include receiving a content stream request, such as a content stream request from a user. For example, a user (and/or a user profile) can request a content stream via the voice-controlled device 110 or the electronic device 108 of FIG. 1. In some instances, the content stream request can be received from the service provider 106 so that the content stream can be provided from the service provider 106 to the devices associated with the user profile of the user 112. In some embodiments, the content stream request can be received as a function call requesting a URL (Uniform Resource Locator) of the content stream, and the content producer 102 can respond by transmitting the URL of the content stream to the requesting party (as described in connection with FIGS. 2A and 2B).

At 512, the operation includes transmitting the content stream in response to the content stream request, as described in connection with FIGS. 2A and 2B. The content stream can be hosted by the content producers 102 and/or by the service providers 106, as can be understood in the context of this disclosure.

Figure 6:
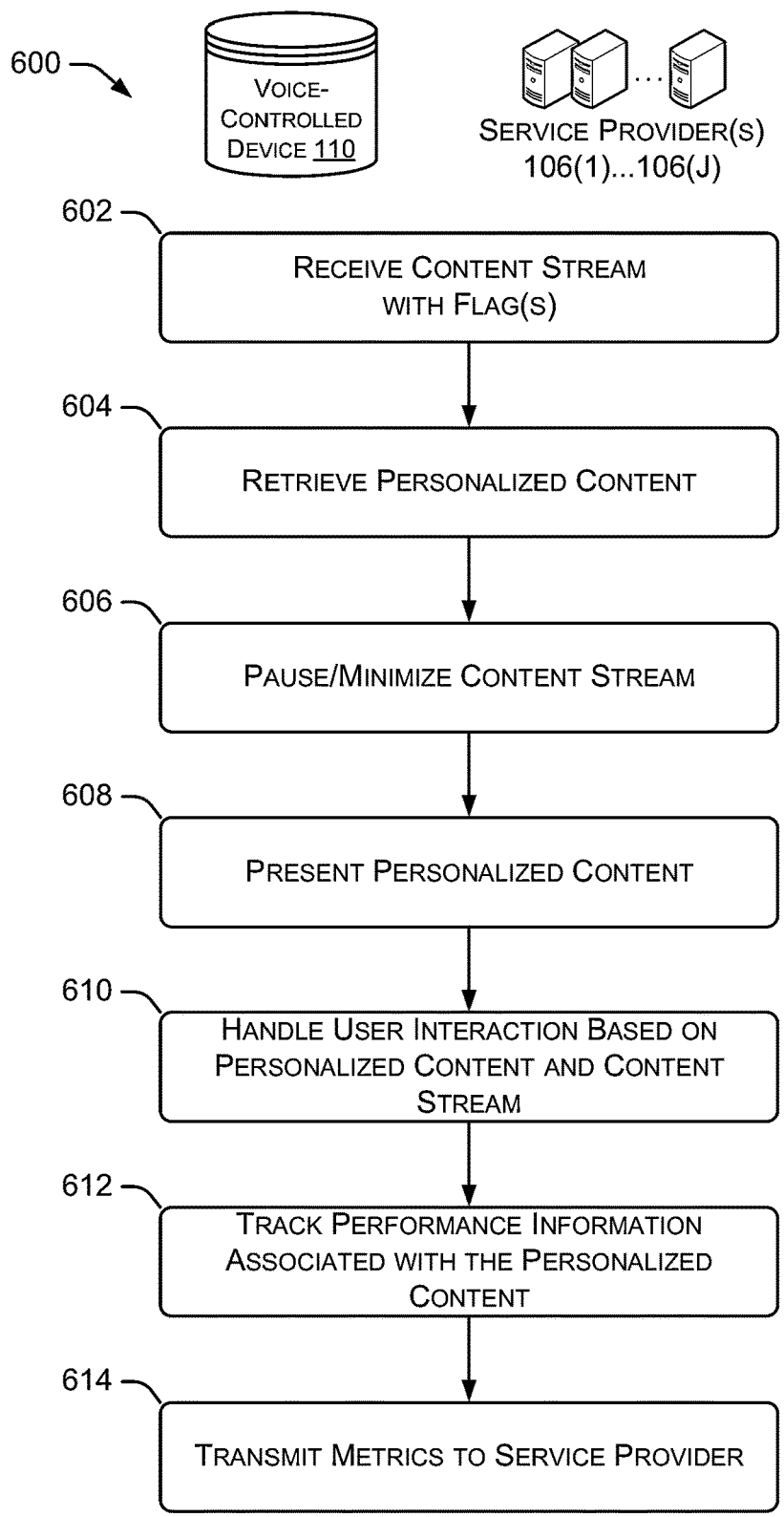
FIG. 6 illustrates a process for receiving a content stream and personalized content and handling user interaction with the personalized content.

FIG. 6 illustrates a process 600 for receiving a content stream and personalized content and handling user interaction with the personalized content. For example, aspects of the process 600 can be performed by the service providers 106, the voice-controlled device 110, and the electronic devices 108, as illustrated in FIG. 1.

At 602, the operation includes receiving a content stream with one or more flags. For example the service providers 106 can receive the content stream and flags, and based in part on the flags, can determine the properties of the content stream as well as the properties of which personalized content can be presented in conjunction with the content stream.

At 604, the operation includes retrieving personalized content. For example, the operation 604 can include retrieving personalized content from the service provider 106 or the personalized content provider 104. For example, the operation can parse the content and flag received in the operation 602, and based in part on the flag and the user profile associated with the user, the operation can retrieve personalized content. By way of example, in the event that the content stream includes a podcast and a user (or user profile) is not a member of a book club associated with the service provider 106, personalized content can include an invitation to join a book club. By way of another example, if the user (or user profile) is a member of the book club associated with the service provider 106, the personalized content may not include an invitation to join the book club. In this manner, the personalized content provided to the voice-controlled device 110 can be personalized based in part on the subject of the content stream and based in part on a profile of the user.

Further, the operation 604 of retrieving the personalized content can include retrieving companion content associated with the personalized content. As described herein, personalized audio content can be presented on the voice-controlled device 110 while companion content can be presented simultaneously with the personalized audio content, substantially simultaneously with the personalized audio content, or at a time removed from the presentation of the personalized audio content.

At 606, the operation includes pausing or minimizing the content stream in preparation of presenting the personalized content. For example, if a flag indicates that personalized content stream can be presented in serial with the content stream, then the content stream can be paused in advance of the presentation of the personalized content stream. This may be accomplished by transmitting in series URLs associated with a content stream and personalized content stream, with the voice-controlled device 110 transitioning to a next URL after the completion of the playing of the content of an earlier URL. In some instances, the service provider 106 can control the scheduling and segmenting of the content and personalized content by transmitting URLs to the device 110 at an appropriate time. If the flag indicates that the personalized content can be presented in parallel with the content stream, then the content stream can be minimized or attenuated (e.g., the volume can be reduced) so that the personalized content can be presented over the content stream. In some instances, while the content stream is paused the content can continue to buffer in memory at the voice-controlled device 110.

At 608, the operation includes presenting the personalized content at the voice-controlled device 110 and/or at the electronic device 108. As described herein, the personalized content can be presented as personalized audio content on the voice-controlled device 110 and the companion content can be presented as personalized visual content on the electronic device 108.

At 610, the operation includes handling user interaction based on the personalized content and the content stream. In various instances, the user interactions can include one or more interactions with the personalized audio content or with the companion content presented in a companion application. For example, the user can respond to a prompt as a question and answer (e.g., " . . . Would you like to know more?" and "Yes, please tell me more.") and/or the user can interrupt the personalized audio content with a voice utterance or command (i.e., without a prompt for an interaction). In another example, the user can interact with the companion content, for example, by selecting a prompt or providing input to indicate a user interaction (e.g., by selecting a button or menu item indicating "Tell me more."). As can be understood in the context of this disclosure, the personalized content including the personalized audio content and the companion content can include a predetermined response based on one or more user interactions, and can be defined by the personalized content provider 104 and/or by the service provider 106. Further, as can be understood in the context of this disclosure, the flag in the content stream can influence a possible response to a user interaction. For example, the flag associated with the content stream can indicate that the content stream may not be interrupted or delayed by a user interaction (beyond the delay associated with presenting the personalized content).

At 612, the operation includes tracking the performance information associated with the personalized content. For example, this operation 612 can include tracking when the personalized content is presented to a user, when a user interacts with the personalized content, if a user conducts an action in response to the personalized content (e.g., purchasing a product), whether a user replays, skips, pauses, dismisses personalized content, etc. At 614, the operation includes transmitting the metrics to the service provider.

Figure 7:
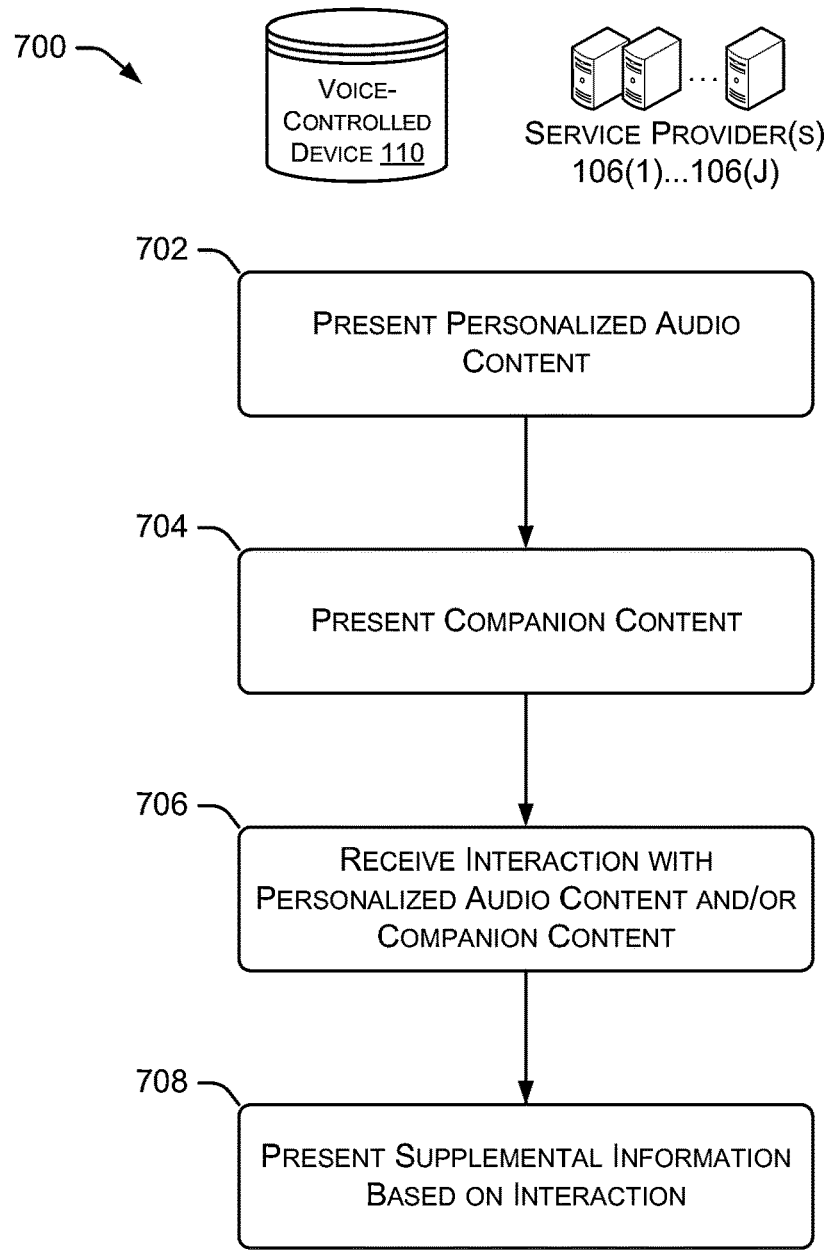
FIG. 7 illustrates a process for presenting a personalized audio content, companion content, and supplemental information based on a user interaction.

FIG. 7 illustrates a process 700 for presenting personalized audio content, companion content, and supplemental information based on a user interaction. For example, aspects of the process 700 can be performed by the service providers 106, the voice-controlled device 110, and the electronic devices 108, as illustrated in FIG. 1.

At 702, the operation includes presenting personalized audio content. For example, the operation 702 can include providing the personalized audio content from the service provider 106 or the personalized content producer 104 to the voice-controlled device 110 and/or can include presenting the personalized audio content at the voice-controlled device 110. At 704, the operation includes presenting companion content. In various implementations, the companion content can be presented on an electronic device 108 associated with the user profile of the user 112 and/or associated with the voice-controlled device 110. At 706, the operation includes receiving an interaction, which can include receiving an interaction with the personalized audio content and/or the companion content. At 708, the operation includes presenting supplemental information based on the interaction in the operation 706. For example, supplemental information may be presented in a variety of formats and at a variety of times. In some instances, the supplemental information can be presented as additional personalized audio content and/or as additional companion content on the electronic device 108, or by providing a personalized content URL to the voice-controlled device 110. In some instances, the supplemental information can be presented at a time proximate to the interaction or at a time distal to the interaction, such as a later time when a user is more likely to review the supplemental information, or at a later time to remind the user of the interaction. In some instances, the supplemental information can be presented as an email, SMS/MMS message, telephone call, live chat, one or more generic or specialized applications, etc. In some instances, the supplemental information can be provided in physical form as a mailer to the user, or as a package including additional information or materials.

Figure 8:
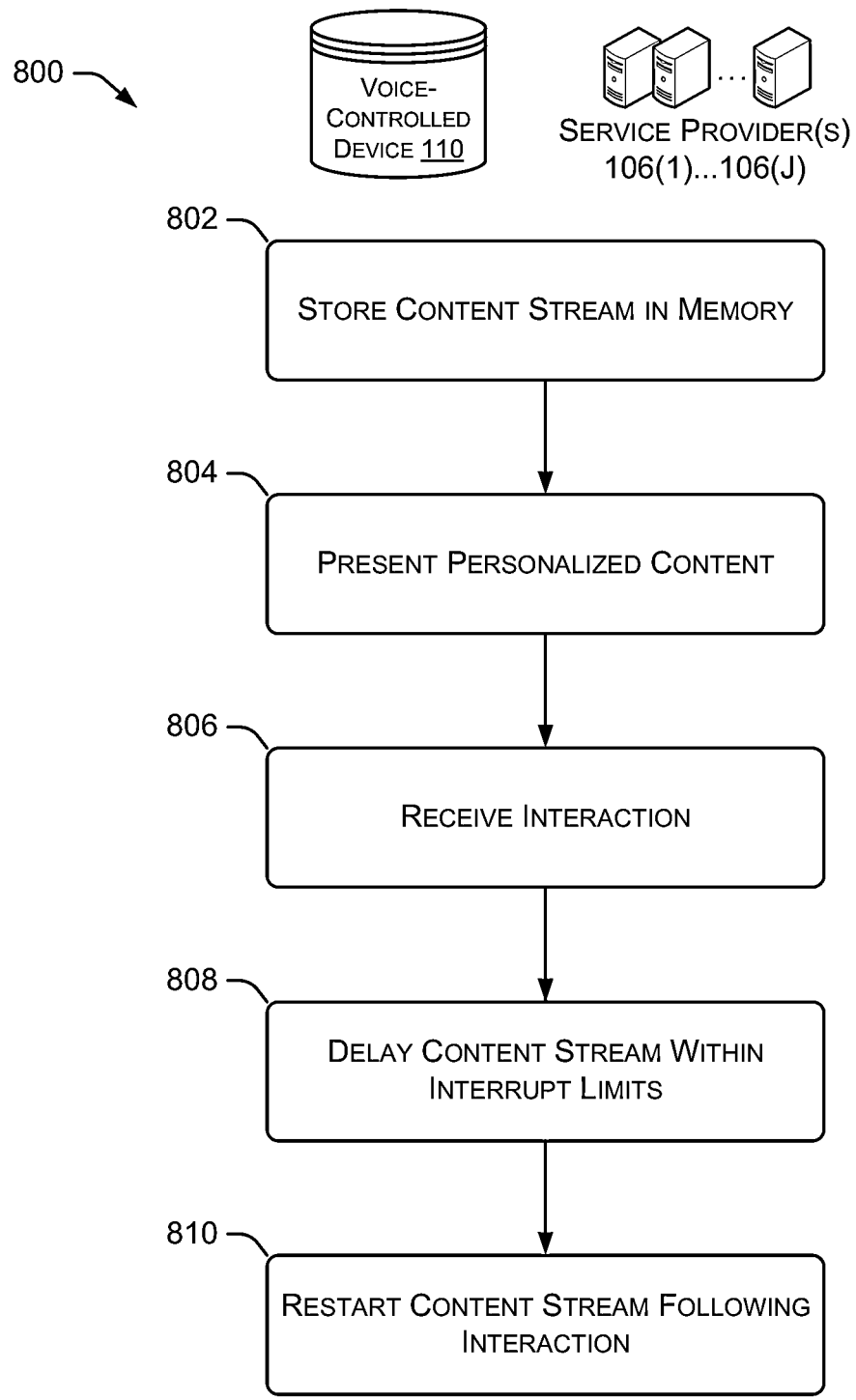
FIG. 8 illustrates a process for managing content and personalized content in connection with a user interaction.

FIG. 8 illustrates a process for managing content and personalized content in connection with a user interaction. For example, aspects of the process 800 can be performed by the service providers 106, the voice-controlled device 110, and the electronic devices 108, as illustrated in FIG. 1.

At 802, the operation includes storing a content stream in a memory, such as a memory 122 of the voice-controlled device 110. In some instances, the content stream is paused in preparation for presenting the personalized content in operation 804. At 806, the operation includes receiving an interaction. As described in this disclosure, the interaction can be received as a voice interaction with the voice-controlled device 110 and/or can be received as an interaction with companion content presented in a companion application of the electronic device 108, for example. At 808, the operation includes delaying the content stream within interrupt limits, such as interrupt limits indicated in a flag associated with the content stream stored in the operation 802. For example, the interaction can indicate an additional personalized content to be presented, such as personalized audio content providing supplemental information in response to the interaction. At 810, the operation includes restarting the content stream following the interaction and following the presentation of supplemental information, if any. For example, the operation 810 can include calling the content stream out of memory of the voice-controlled device 110 to present the content stream (such as an audio stream) in accordance with embodiments of the disclosure. In some instances, the timing and coordination of the content and personalized content may be controlled via the transmitting of various URLs from the service provider 106 to the voice-controlled device 110.

Figure 9:
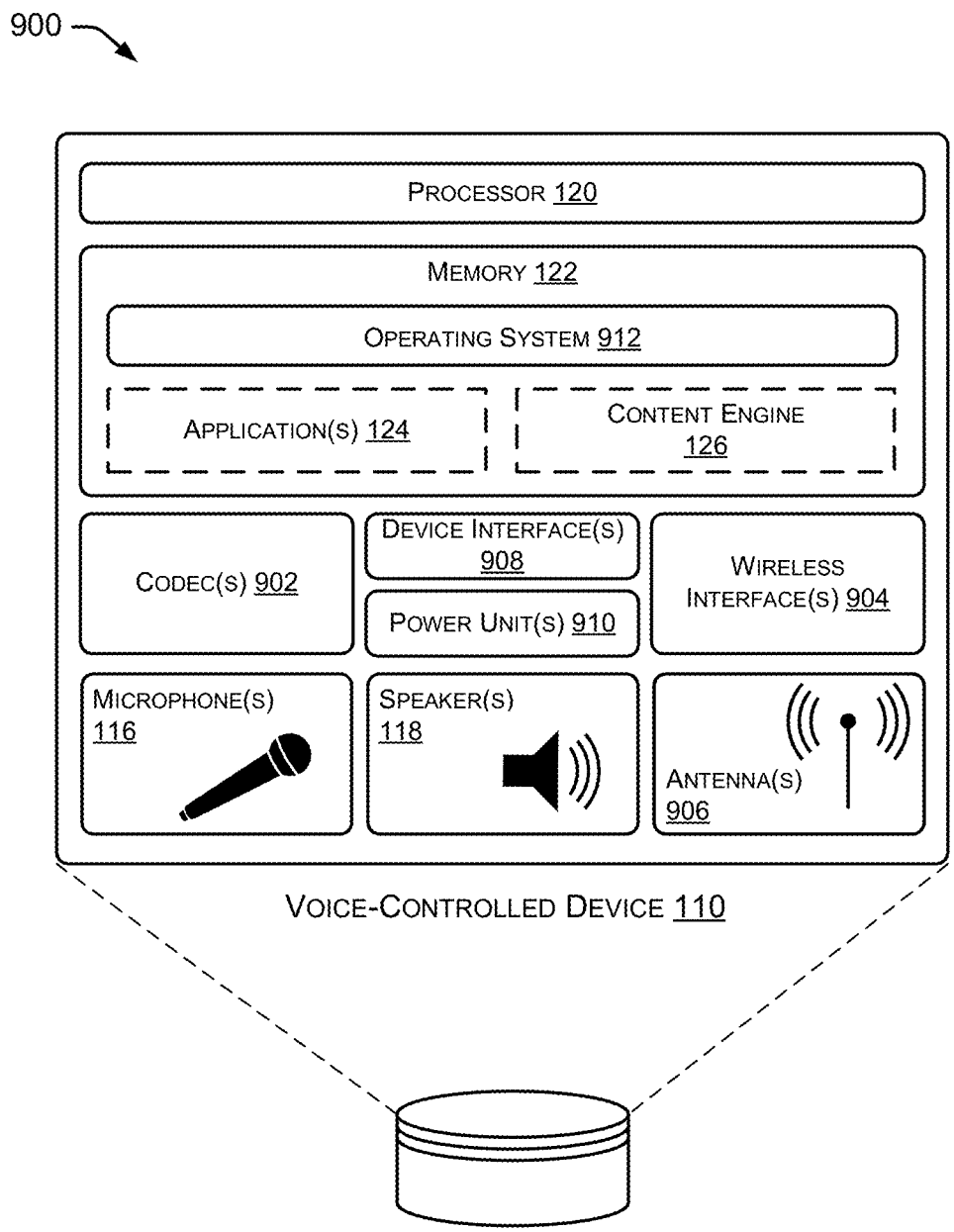
FIG. 9 shows a block diagram of selected functional components implemented in the voice-controlled device of FIG. 1.

FIG. 9 shows selected functional components of one implementation 900 of the voice-controlled device 110 in more detail. Generally, the voice-controlled device 110 can be implemented as a standalone device that is relatively simple in terms of functional capabilities with limited input/output components, memory and processing capabilities. For instance, the voice-controlled device 110 does not have a keyboard, keypad, or other form of mechanical input in some implementations, nor does it have a display or touch screen to facilitate visual presentation and user touch input. Instead, the device 110 can be implemented with the ability to receive and output audio, a network interface (wireless or wire-based), power, and limited processing and/or memory capabilities.

In the illustrated implementation, the voice-controlled device 110 includes the processor 120 and memory 122. The memory 122 can include computer-readable storage media ("CRSM"), which can be any available physical media accessible by the processor 120 to execute instructions stored on the memory. In one basic implementation, CRSM can include random access memory ("RAM") and Flash memory. In other implementations, CRSM can include, but is not limited to, read-only memory ("ROM"), electrically erasable programmable read-only memory ("EEPROM"), or any other medium which can be used to store the desired information and which can be accessed by the processor 120.

The voice-controlled device 110 includes a microphone unit that comprises one or more microphones 116 to receive audio input, such as user voice input. The device 110 also includes a speaker unit that includes one or more speakers 118 to output audio sounds. One or more codecs 902 are coupled to the microphone(s) 116 and the speaker(s) 118 to encode and/or decode the audio signals. The codec can convert audio data between analog and digital formats. A user can interact with the device 110 by speaking to it, and the microphone(s) 116 captures sound and generates an audio signal that includes the user speech. The codec(s) 902 encodes the user speech and transfers that audio data to other components. The device 110 can communicate back to the user by emitting audible statements through the speaker(s) 118. In this manner, the user interacts with the voice-controlled device simply through speech, without use of a keyboard or display common to other types of devices.

In the illustrated example, the voice-controlled device 110 includes one or more wireless interfaces 904 coupled to one or more antennas 906 to facilitate a wireless connection to a network. The wireless interface(s) 904 can implement one or more of various wireless technologies, such as Wi-Fi, Bluetooth, RF, cellular, and so on. The wireless interfaces 904 can receive commands from the electronic devices 108, such as a user interaction with the companion content to cause the presentation of additional supplemental information.

One or more device interfaces 908 (e.g., USB, broadband connection, etc.) can further be provided as part of the device 110 to facilitate a wired connection to a network, or a plug-in network device that communicates with other wireless networks. One or more power units 910 are further provided to distribute power to the various components on the device 110.

The voice-controlled device 110 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 110 can include non-input control mechanisms, such as basic volume control button(s) for increasing/decreasing volume, as well as power and reset buttons. There can also be one or more simple light elements (e.g., LEDs around perimeter of a top portion of the device) to indicate a state such as, for example, when power is on or to indicate when a command is received. But, otherwise, the device 110 does not use or need to use any input devices or displays in some instances.

Several modules such as instruction, data stores, and so forth can be stored within the memory 122 and configured to execute on the processor 120. An operating system module 912 is configured to manage hardware and services (e.g., wireless unit, Codec, etc.) within and coupled to the device 110 for the benefit of other modules. In addition, the memory 122 can include the applications 124 including a speech-processing engine and the content engine 126. The content engine 126 can include some or all of the modules described with reference to FIG. 1 as being stored in the memory 132 of the service providers 106. As such, the content engine 126 can generally function to select personalized content that has been personalized for a user and/or for a user profile.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more computer-readable media storing instructions that, when executed by the one or more processors, cause the one or more processors to perform operations comprising:
sending, to a first device, first data representing first audio content, the first device being associated with user profile data;
receiving, from the first device and while a speaker of the first device outputs audio corresponding to the first audio content, audio data representing user speech;
determining, based at least in part on the audio data, one or more words represented by the user speech;
determining that the one or more words include a response related to a portion of the first audio content;
determining, based at least in part on the response, second audio content that is related to the portion of the first audio content;
identifying a second device based at least in part on an identifier of the second device being associated with the user profile data; and
sending, to the second device, second data representing the second audio content.

2. The system as recited in claim 1, wherein the first audio content is personalized content, and wherein the operations further comprise:
sending, to the first device, third data representing at least a portion of user-generic content; and
determining to present, at a time, the personalized content with the user-generic content, wherein sending the first data occurs at the time.

3. The system as recited in claim 2, the operations further comprising, after sending the second data, sending, to the first device, fourth data representing an additional portion of the user-generic content.

4. The system as recited in claim 1, wherein the first data is additional audio content representing the first audio content, and wherein the operations further comprise determining that the audio data is received while the first device is outputting the first audio content represented by the additional audio data.

5. The system as recited in claim 1, wherein:
the audio data is first audio data;
the first data is second audio data representing the first audio content; and
the second data includes image data associated with the second audio content.

6. The system as recited in claim 1, wherein:
the portion of the first audio data represents at least one of a question or a prompt; and
determining that the user speech includes the response comprises determining that the user speech represents a response to the at least one of the question or the prompt.

7. The system as recited in claim 1, wherein:
the first device is a voice-controlled device;
the first data is additional audio data represented the first audio content;
the second device includes a display; and
the second data includes image data associated with the second audio content.

8. The system as recited in claim 1, the operations further comprising storing the user profile data, the user profile data being associated with first identifier data associated with the first device.

9. A method comprising:
determining first audio content;
sending, to a first device, first data representing the first audio content, the first device being associated with user profile data;
receiving, by one or more computing devices and from the first device while a speaker of the first device outputs audio corresponding to the first audio content, audio data representing user speech;
determining, based at least in part on the audio data, one or more words represented by the user speech;
determining, by the one or more computing devices, that the one or more words include an interaction associated with a portion of the first audio content;
based at least in part on the interaction, determining second audio content that is related to the portion of the first audio content;
identifying a second device based at least in part on an identifier of the second device being associated with the user profile data; and
sending, to the second device, second data representing the second audio content.

10. The method as recited in claim 9, wherein the first audio content is personalized content, and wherein the method further comprises:
sending, to the first device, third data representing at least a portion of user-generic content; and
determining to present, at a time, the personalized content with the user-generic content, wherein sending the first data occurs at the time.

11. The method as recited in claim 10, the method further comprising, after sending the second data, sending, to the first device, fourth data representing an additional portion of the user-generic content.

12. The method as recited in claim 9, wherein determining the second audio content comprises determining, based at least in part on the user profile data, the second audio content that is related to the first audio content.

13. The method as recited in claim 9, further comprising:
receiving, from the first device, additional audio data representing additional user speech;
determining that the additional user speech includes an additional interaction associated with the second audio content;
determining third audio content that is related to the second audio content; and
sending, to at least one of the first device or the second device, third data representing the third audio content.

14. The method as recited in claim 9, wherein determining the second audio content that is related to the first audio content comprises at least:
sending, to one or more additional devices, third data indicating the interaction; and
receiving, from the one or more additional devices, the second data representing the second audio content.

15. The method as recited in claim 9, wherein the audio data is first audio data, the one or more words are one or more first words, the first data representing the first audio content is second audio data representing one or more second words that include a question, and determining that the one or more first words include the interaction comprises determining that the one or more first words include a response to the question.

16. The method as recited in claim 9, wherein the audio data is first audio data, the one or more words are one or more first words, the first data representing the first audio content is second audio data representing one or more second words that include a prompt, and determining that the one or more first words include the interaction comprises determining that the one or more first words include the interaction associated with the prompt.

17. The method as recited in claim 9, further comprising storing the user profile data, the user profile data being associated with first identifier data associated with the first device.

18. One or more computing devices comprising:
one or more processors; and
one or more computer-readable media storing instructions that, when executed by the one or more processors, cause the one or more processors to perform operations comprising:
sending, to a first device, first data representing user-generic audio content, the first device being associated with user profile data;
determining that first personalized audio content is to be presented in connection with the user-generic audio content;
after sending the first data, sending, to the first device, second data representing the first personalized audio content;
receiving, from the first device and while the first device outputs audio corresponding to the first personalized audio content, audio data representing user speech;
determining, based at least in part on the audio data, one or more words represented by the user speech;
determining that the one or more words include an interaction associated with a portion of the first personalized audio content;
based at least in part on the interaction, identifying a second device based at least in part on an identifier of the second device being associated with the user profile data; and
sending, to the second device, third data representing second personalized audio content.

19. The one or more computing devices as recited in claim 18, the operations further comprising determining the second personalized audio content based at least in part on the interaction.

20. The one or more computing devices as recited in claim 18, the operations further comprising:
receiving the user profile data; and
determining the first personalized audio content based at least in part on the user profile data.

* * * * *